United States Patent [19]

Hisegawa et al.

[11] 4,322,800
[45] Mar. 30, 1982

[54] METHOD OF REDUCING FUEL CONSUMPTION RATE IN INTERNAL COMBUSTION ENGINES

[75] Inventors: Takashi Hisegawa, Chiryu; Osamu Ito, Toyota; Nobuhito Hobo, Inuyama; Yoshihiko Tsuzuki, Toyota; Yutaka Suzuki, Nishio; Mikio Kumano, Kariya; Masaharu Sumiyoshi, Toyota, all of Japan

[73] Assignees: Nippondenso Co., Ltd., Kariya; Toyota Jidosha Kogyo Kabushiki Kaisha, Toyota, both of Japan

[21] Appl. No.: 136,331

[22] Filed: Apr. 1, 1980

[30] Foreign Application Priority Data

Apr. 4, 1979 [JP] Japan ................................. 54-40730

[51] Int. Cl.³ ............................ F02P 5/08; F02B 5/02
[52] U.S. Cl. ............................. 364/431.05; 123/417; 123/418; 123/419; 364/442
[58] Field of Search ............... 364/431, 442; 123/417, 123/480, 486, 418, 419

[56] References Cited

U.S. PATENT DOCUMENTS

| | | | |
|---|---|---|---|
| 4,181,944 | 1/1980 | Yamauchi et al. ................. | 364/431 |
| 4,200,064 | 4/1980 | Engele ............................. | 123/480 X |
| 4,201,159 | 5/1980 | Kawai et al. ..................... | 123/480 X |
| 4,201,161 | 5/1980 | Sasayama et al. ................ | 123/486 |
| 4,229,793 | 10/1980 | Yoshida et al. ................... | 364/431 |
| 4,236,214 | 11/1980 | Sasayama ........................ | 354/431 |

Primary Examiner—Felix D. Gruber
Attorney, Agent, or Firm—Cushman, Darby & Cushman

[57] ABSTRACT

An optimum control method for internal combustion engines uses the values of an engine control variable, such as engine timing, which are arranged in a map and stored in a memory. During normal operation, the engine is operated in accordance with one of the mapped engine control variable values related to engine operating conditions. During a fuel consumption minimization operation, the mapped engine control variable value is changed by an incremented amount to operate the engine therewith, and the mapped engine control variable value is replaced by the changed engine control variable value, if it is detected that the change by the incremented amount is in a direction to reduce the fuel consumption rate of the engine. This optimum engine control method can compensate for changes in the characteristics of engines caused during the manufacture or caused by changes over time during their operation, thereby ensuring the operation of an engine at a minimum rate of fuel consumption.

7 Claims, 8 Drawing Figures

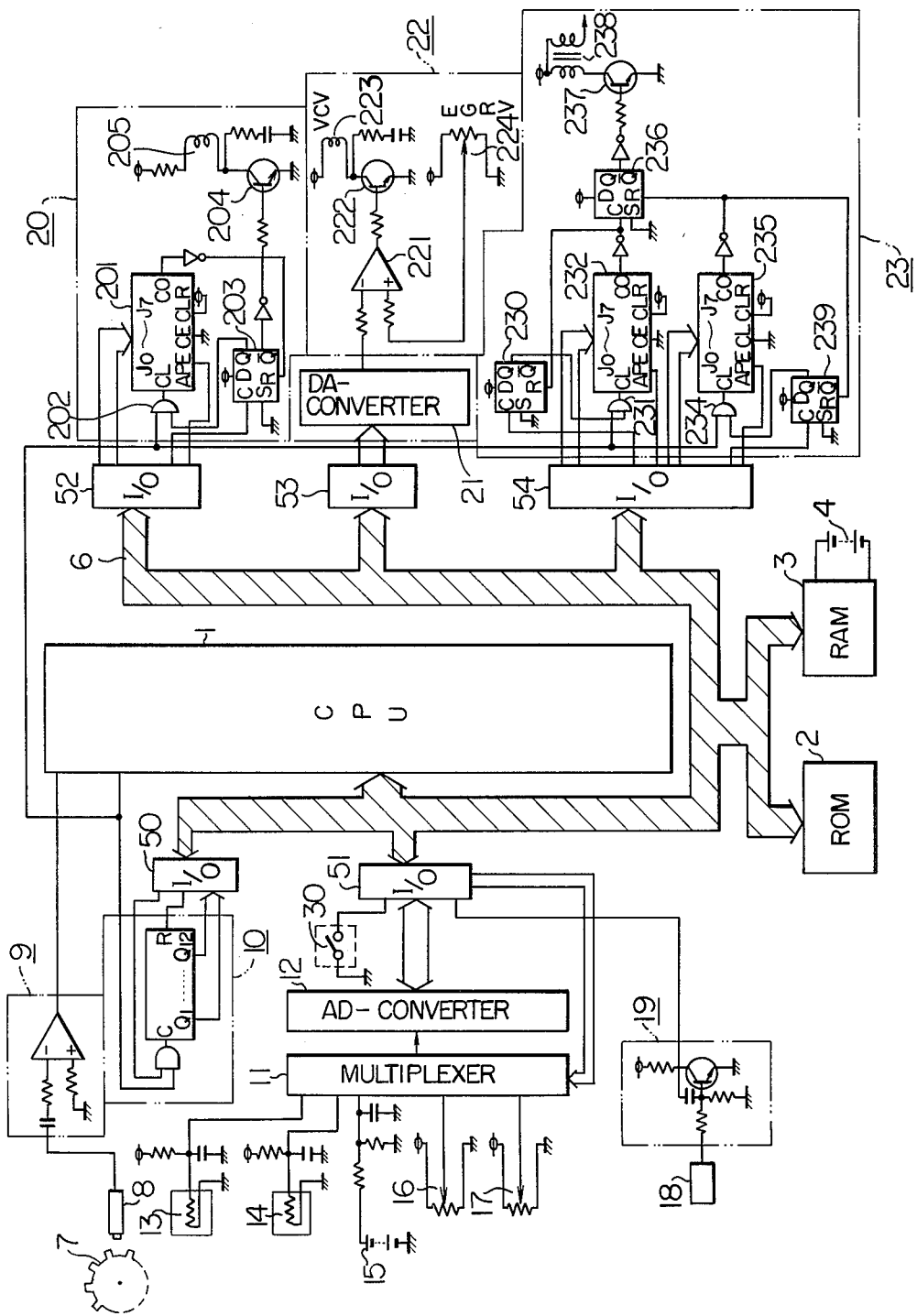

METHOD OF REDUCING FUEL CONSUMPTION RATE IN INTERNAL COMBUSTION ENGINES

BACKGROUND OF THE INVENTION

1. Field of the Invention

The present invention relates to an optimum control method for internal combustion engines which is capable of controlling an engine such that the engine is operated at a minimum rate of fuel consumption.

2. Description of the Prior Art

One of the engine control methods, which have heretofore been proposed for the purpose of reducing fuel consumption, is to preset an ignition timing advance pattern with respect to, for example, engine speeds and intake vacuum as control parameters and the advance pattern is mechanically realized faithfully. Alternatively, engine control variables such as ignition timing, air-fuel ratio and EGR rate (rate of exhaust gas recirculation) are preliminarily arranged in maps with respect to such parameters as engine speeds and intake vacuum which are indicative of the engine operating conditions and the operating conditions of the engine are controlled in accordance with the mapped engine control variables. However, these known control methods are disadvantageous in that these methods can not compensate for the variation in the characteristics of engines over time or the variation in the characteristics of engines caused during manufacture, thus failing to accurately control the rate of fuel consumption.

SUMMARY OF THE INVENTION

With a view to overcoming the foregoing deficiencies in the prior art, it is the object of this invention to provide an optimum control method for internal combustion engines whereby a fuel consumption minimization operation is performed in response to, for example, the closing of a manual switch during normal operation of an engine. More specifically, at least one engine control variable (for example, the ignition timing, air-fuel ratio or EGR rate) is arranged preliminarily in the form of a map with respect to parameters (for example, engine speed and intake vacuum) which are indicative of the engine operating conditions. During normal operation, the engine is operated in accordance with one of the values of the engine control variable determined by the current operating conditions. During the fuel consumption minimization operation, the mapped value of the engine control variable, determined by the current operating conditions, is changed by a predetermined incremental amount and the engine is operated in accordance with the changed value of the engine control variable, and, if a detected change of an engine operating condition caused by the changed value of the control variable is in a direction to reduce the fuel consumption rate, the mapped engine control variable value is replaced by the engine control variable value changed by the predetermined incremental amount, thus providing compensation for the variation in the characteristics of an engine over time or for the variation in the characteristics of engines caused during manufacture and thereby ensuring minimum fuel consumption engine operation.

Thus, in the preferred embodiment, ignition timing is the engine control variable and ignition timing values are arranged in a map and stored in a memory. During normal operation, the engine is operated in accordance with one of the mapped ignition timing values related to the particular engine speed and intake vacuum. During a fuel consumption minimization operation, when the engine is in a steady operating condition, the mapped ignition timing value is changed by a predetermined incremental amount and the engine is operated with the changed value. If it is detected that the incremental change produces an increase in speed, and therefore the rate of fuel consumption per unit distance, the ignition timing value is replaced by the changed ignition timing value, thus minimizing fuel consumption.

BRIEF DESCRIPTION OF THE DRAWINGS

FIG. 6 is a diagram showing the construction of an apparatus for performing the control method according to the embodiment.

DESCRIPTION OF THE PREFERRED EMBODIMENT

The present invention will now be described in greater detail with reference to the illustrated embodiment.

Figure 1:
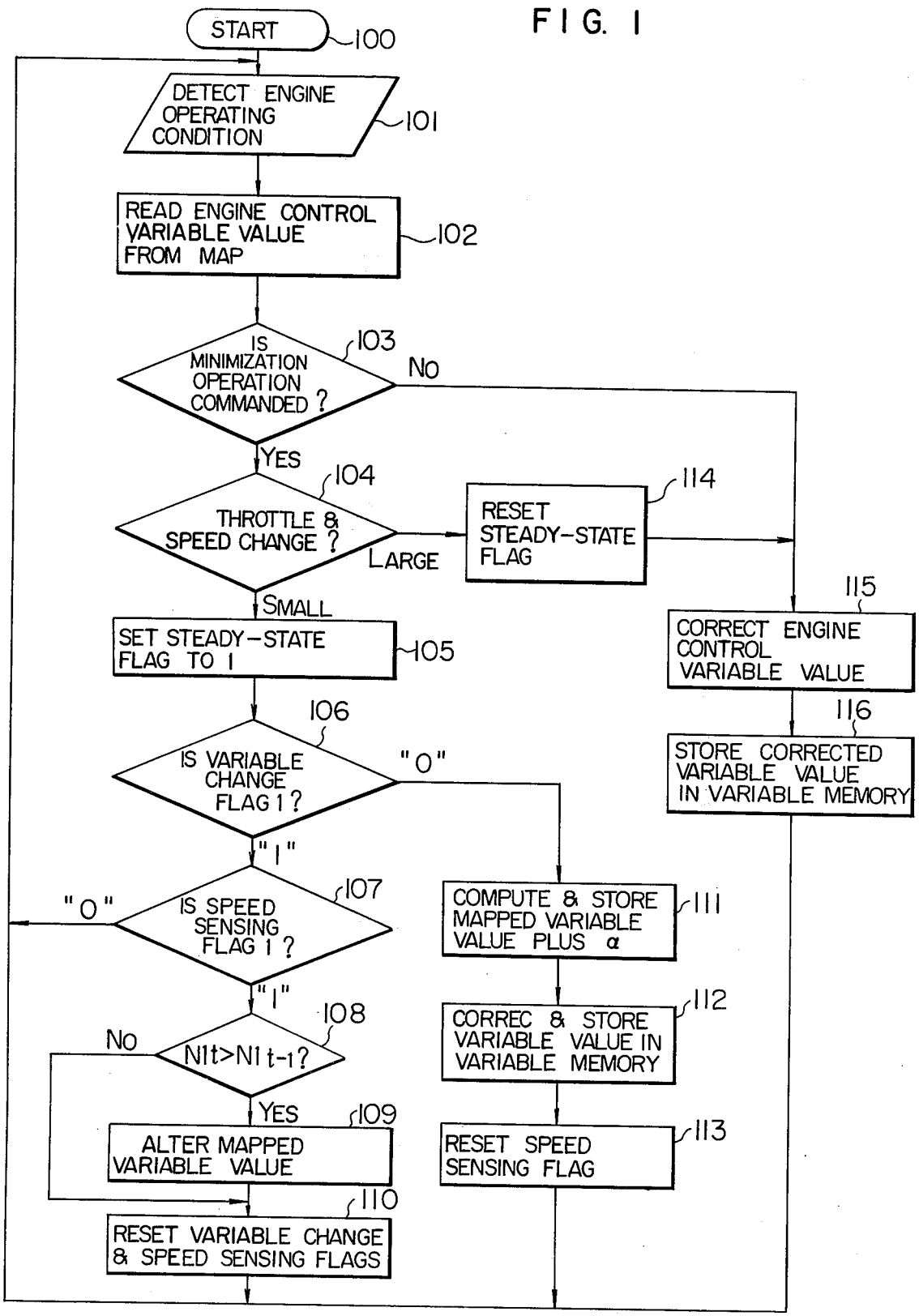
FIG. 1 is a flowchart showing the main routine of the computer processing program for use in an embodiment of the present invention.

Referring to FIG. 1, there is illustrated a flowchart showing the main routine of the processing program used to perform the normal engine operation and the minimum fuel consumption operation when the method of this invention is applied to automobiles. When a key switch for an engine is closed, the computational processing is started by a step 100. The next step 101 detects the engine speed, intake vacuum, cooling water temperature, intake air temperature, battery voltage, throttle position, starter ON or OFF condition, etc., which are factors or parameters indicative of the engine operating conditions. The next step 102 selects the corresponding value of an engine control value (the ignition timing in this embodiment) preliminarily stored in a RAM (a read/write memory) in the form of a map in accordance with the engine speed and the intake vacuum among the parameters indicative of the engine operating conditions. The next step 103 determines whether normal operation or fuel consumption minimization operation is commanded to be performed. In this embodiment fuel consumption minimization operation is performed in response to the closing of a manual command switch described later. If the step 103 determines that the normal operation is commanded to be performed, the control is transferred to a step 115. The step 115 corrects the value of the control variable value (the ignition timing) read out of the map in accordance with the intake air temperature, cooling water temperature, battery voltage, throttle position and starter ON or OFF condition, and the next step 116 stores the corrected control variable value in an associated variable memory. When the step 116 is completed, the control is returned to the first step 101. On the contrary, if the step 103 determines that fuel consumption minimization operation is commanded to be performed, the processing proceeds to a step 104 which determines whether a change in the throttle position and a change in the engine speed (the value $N2_t$ representing the speed just after each top dead center of a cylinder) are respectively greater or smaller than predetermined values (that is, determines whether the engine is in an accelerating or decelerating operation or in a substantially constant speed operation). If these changes are greater than predetermined values, the minimum fuel consumption operation is stopped temporarily and the processing is transferred to a step 114 which resets (to "0") a steady-state flag that will be described later. The normal engine operation is then performed through the steps 115 and 116 in the same manner as mentioned previously.

When the previously mentioned throttle position change and engine rpm change are smaller than the respective predetermined values, the processing proceeds to a step 105 to perform the minimum fuel consumption operation. The step 105 sets the steady-state flag to "1" thereby indicating that the engine speed and the throttle position are substantially constant (in the steady-state condition). The next step 106 determines whether a variable change flag is "1" or "0" (the flag is set to "1" when the variable value read out of the map is changed by $\alpha$ to effect the fuel consumption minimization operation). If the flag is "0", the processing is transferred to a step 111. The step 111 adds the value of $\alpha$ (the method of determining this value will be described later) to the control variable value from the map and stores the resultant value. The next step 112 corrects the control variable value changed by $\alpha$ in accordance with the intake vacuum, cooling water temperature, battery voltage and throttle position which are indicative of the engine operating condition and then stores the corrected variable value in the variable memory. The next step 113 resets a speed sensing flag which will be described later, and the processing is returned to the first step 101. When the step 106 determines that the variable change flag has been set to "1", the processing proceeds to a step 107 which detects the state of the speed sensing flag (the flag is set to "1" when the engine speed is sensed after the controlled variable value has been changed by $\alpha$). If the speed sensing flag is "0", the processing is returned to the first step 101. If the speed sensing flag is "1", the processing proceeds to a step 108 which detects the change of the engine speed (i.e., the current speed value $N1_t$ at the current piston top dead center position is compared with the preceding speed value $N1_{t-1}$ at the preceding top dead center position) in accordance with an engine speed signal which will be described later. If $N1_t > N1_{t-1}$, the step 108 determines that the fuel consumption has been reduced and the next step 109 replaces the mapped engine control variable value by the engine control variable changed by $\alpha$ in the step 111. Then, a step 110 resets the variable change flag and the speed sensing flag, and the processing is returned to the first step 101. On the contrary, if the step 108 determines that the speed value $N1_t$ is smaller than the value of $N1_{t-1}$, it is decided that the fuel consumption has deteriorated, and the processing is transferred to the step 110 without altering the mapped engine controlled variable value.

Figure 2:
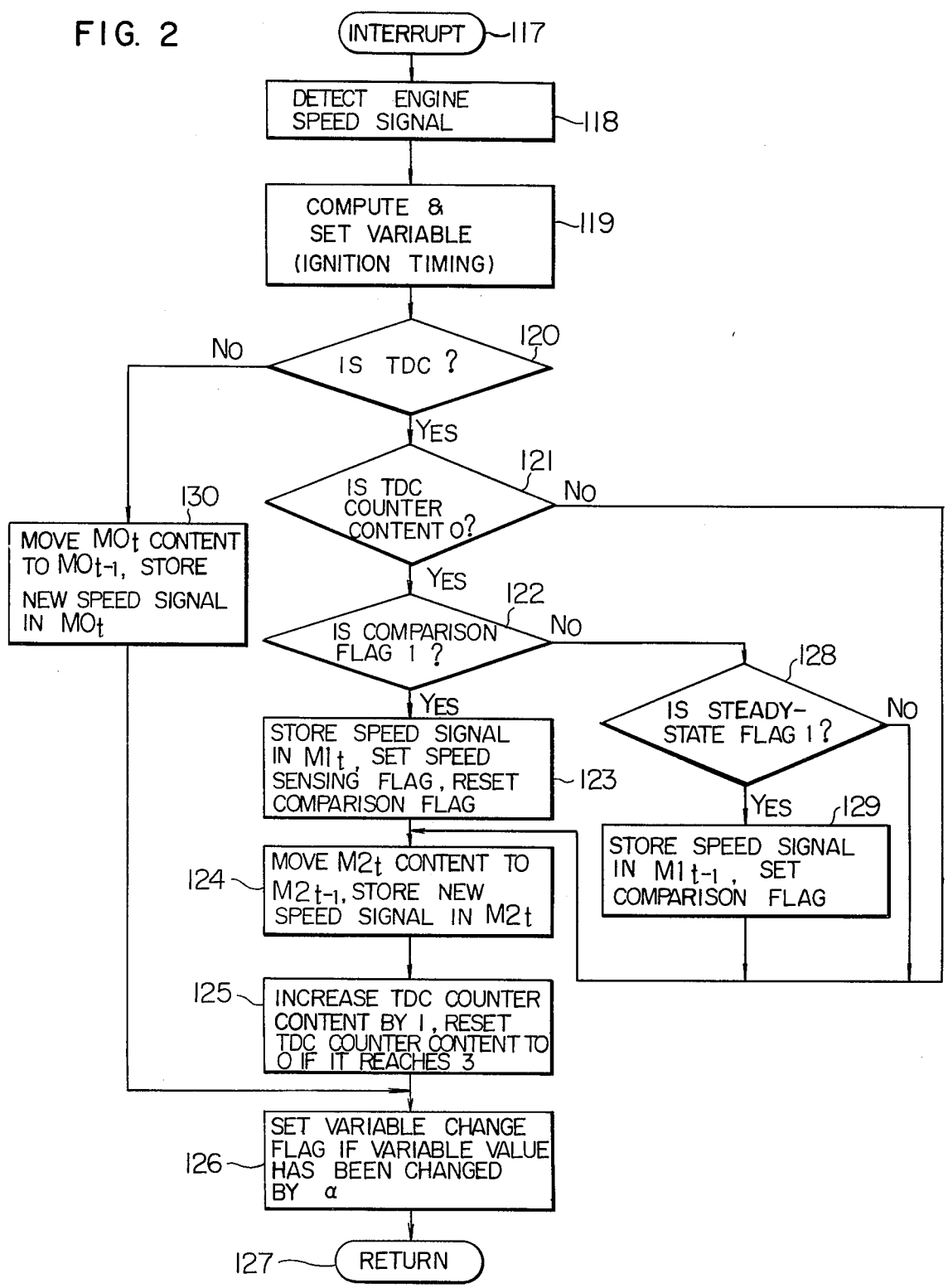
FIG. 2 is a flowchart showing the interruption routine of the processing program for use in the embodiment.
Figure 7A:
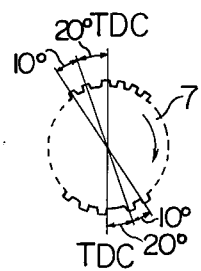
FIGS. 7a and 7b are diagrams for explaining the method of detecting the engine speed and the top dead center according to the embodiment.
Figure 7B:
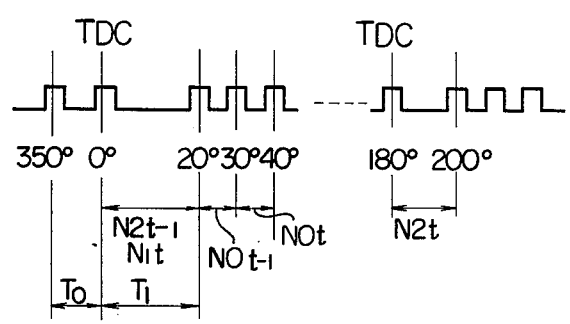

Referring now to FIG. 2, an interruption routine for detecting the engine speed, etc. will be described. More precisely, as will be described later with reference to FIGS., 6, 7a and 7b, when the output signals from the electromagnetic pickup 8 are reshaped in the waveform reshaping circuit 9 in FIG. 6 and the resultant pulses shown in FIG. 7b are supplied to the CPU 1 (more specifically, to the interrupt input terminal of the CPU 1), the processing of the interruption routine shown in FIG. 2 is started in the CPU 1.

When the CPU 1 has started the processing of the interruption routine, the CPU 1 causes the speed counting circuit 10 to measure the time intervals $T_0$ and $T_1$ by counting clock pulses via the input/output port 50 until the CPU 1 is commanded to execute a next interruption processing. Further, immediately before the CPU 1 causes the speed counting circuit 10 to start the measurement of the time intervals $T_0$ and $T_1$, the CPU 1 reads the previous values of the time intervals $T_0$ and $T_1$ counted by the speed counting circuit 10 and computes the reciprocals of the previous values of the time intervals $T_0$ and $T_1$ to obtain the engine speed values $N0_t$, $N1_t$, $N2_t$, etc.

Here, the engine speed information symbols used in the description of the present invention will be explained. $N0_t$ is used for the computation of the basic ignition timing and it indicates an engine speed value at which the crankshaft rotates through 10 degrees. $N1_t$ is an engine speed information used in a step 108 in FIG. 1 for determining whether the ignition timing meets MBT (minimum advance for best torque), and more particularly it represents an engine speed value at which the crankshaft rotates through 20 degrees from the top dead center of a specified one of multiple cylinders. $N2_t$ is an engine speed information used to determine whether the engine is in a steady-state condition, and more specifically it represents a time interval in which the crankshaft rotates through 20 degrees from the top dead center of one particular cylinder. When a crank angle sensor generates an interrupt signal, a step 117 starts computational processing of the interruption routine. The next step 118 measures the period of the signal from the crank angle sensor with a counter to use the measured period as an engine speed signal. In accordance with the values in the variable memory which are determined by the parameters indicative of the current engine operating condition, a step 119 decides whether an initial value is to be set in an ignition coil energization starting timing counter, and whether an initial value is to be set in an energization stopping timing (ignition timing) counter, and computes the desired values to be set, when necessary. A next step 120 determines whether the crankshaft is at the top dead center (TDC) according to the engine speed signal. If it is not the case, the processing is transferred to a step 130 where the content of a current value memory $M0_t$ for storing the engine speed signal (which content corresponds to the speed value $N0_{t-1}$) is moved to a preceding value memory $M0_{t-1}$, and a new engine speed signal (corresponding to the current speed value $N0_t$) is entered into the current value memory $M0_t$. Then, the processing is transferred to a step 126 which sets the variable change flag to "1", if the controlled variable value (the ignition timing) from the map has been changed by $\alpha$ in the step 111 of the main routine. A next step 127 returns the processing to the main routine. If the step 120 determines that the crankshaft is at TDC, the processing proceeds to a step 121 which decides whether the value of a TDC counter for counting the number of occurrences of TDC is "0". If it is the case, the processing proceeds to a step 122 which decides whether a comparison flag, which will be described later, has been set to "1". If the comparison flag is "0", the processing is transferred to a step 128. The step 128 decides whether the steady-state flag, which indicates whether the engine is effecting a steady-state operation, is "1". If the steady-state flag is "1", then the processing proceeds to a step 129 where an engine speed signal (corresponding to the speed value $N1_{t-1}$) is stored in a memory $M1_{t-1}$ for storing an engine speed signal detected at the TDC of the same cylinder and simultaneously the comparison flag is set to "1" thereby to indicate that the engine speed signal in the memory $M1_{t-1}$ has been detected under the steady-state operating condition of the engine. Then, the processing is transferred to a step 124. If the step 128 decides that the steady-state flag is "0", then the processing is transferred directly to the step 124. On the other hand, if the step 122 determines that the comparison flag has been set to "1", the processing proceeds to a step 123 where the engine speed signal detected at the TDC of the same cylinder (corresponding to the speed value $N1_t$) is stored in the memory $M1_t$, and the speed sensing flag is set to "1" and further the comparison flag is reset. The step 124 moves the engine speed signal (corresponding to the speed value $N2_{t-1}$) in a current value memory $M2_t$, which stores an engine speed signal detected at each TDC of the respective cylinders, to a preceding value memory $M2_{t-1}$, and a new engine speed signal (corresponding to the speed value $N2_t$) is stored in the current value memory $M2_t$. A next step 125 increases the content of the TDC counter by 1, and then resets the TDC counter to "0", if the resultant content of the TDC counter reaches 3 (it is because that this embodiment is intended for use in four-cylinder engines, so that, during the time interval from an occurrence of TDC to a succeeding one for the same cylinder, there are four occurrences of TDC including the occurrences of TDC in the other cylinders). A next step 126 sets the variable change flag to "1", if the engine control variable value (the ignition timing) stored in the variable memory has been changed by $\alpha$ in the step 111 of the main routine. Thereafter, a next step 127 returns the processing to the main routine.

Figure 3:
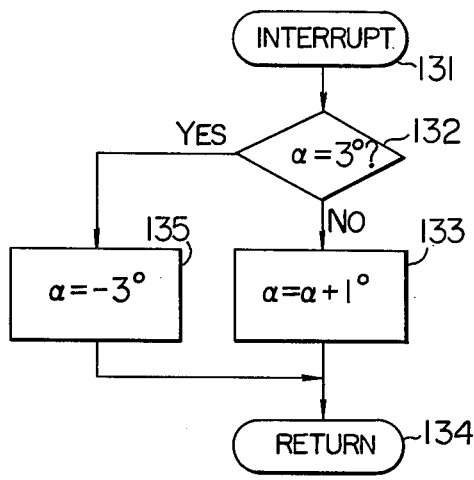
FIG. 3 is a flowchart showing another interruption routine for use in the embodiment for determining the amount of change $\alpha$.

Referring to FIG. 3, the interruption routine for determining the amount $\alpha$ of the above-described change will now be described. An interrupt is initiated at every predetermined period in a step 131, and a next step 132 decides whether the amount $\alpha$ is 3°, for example. If $\alpha$ is 3°, the processing is transferred to a step 135 where $\alpha$ is replaced by $-3$°, for example, and it is stored in the variable change memory. Then, the processing is transferred to a step 134 which returns the processing to the main routine. On the other hand, if the step 132 decides that $\alpha$ is not 3°, the processing proceeds to a step 133 where $\alpha$ is increased by 1°, for example, and it is stored in the variable change memory. Then, the processing is returned to the main routine by the step 134.

Figure 4:
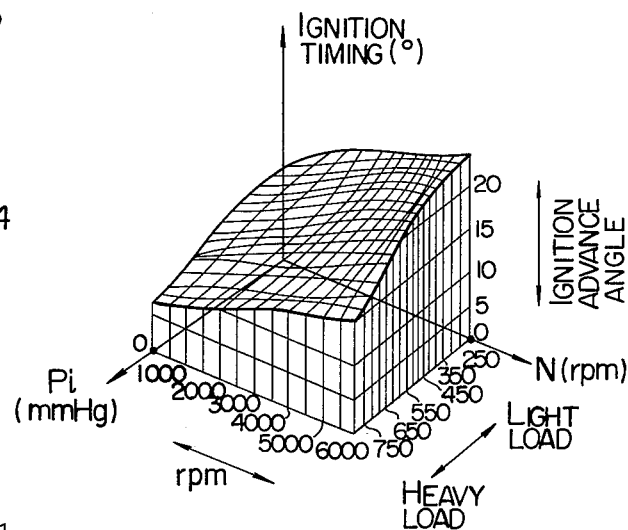
FIG. 4 is a schematic diagram showing the map of ignition timing for use in the embodiment.
Figure 5:
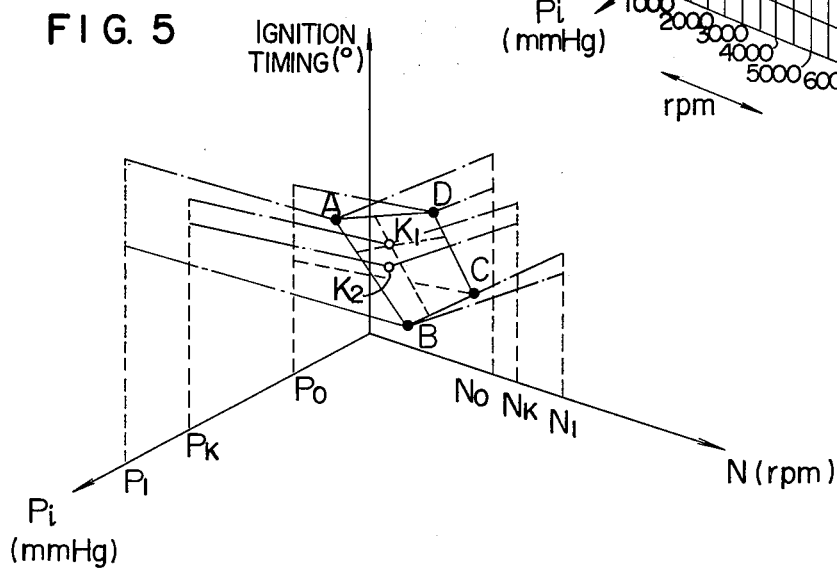
FIG. 5 is a partial enlarged view of the schematic map diagram shown in FIG. 4.

Next, the method of altering the mapped engine control variable value (the ignition timing) will be described. As shown in FIG. 4, the map is formed by arranging the values of engine speeds N(rpm) and intake negative pressure $P_i$ (mmHg), respectively, in a suitable number of sections and an ignition timing angle in degrees (°) is allotted at each of the intersections (data points) of the section lines. The other ignition timing between those at the data points may be obtained by an interpolation method. FIG. 5 is a partial enlarged view of the map of FIG. 4, and symbols A, B, C and D indicate the data points. The points A and D and the points B and C correspond to the same engine speeds $N_0$ and $N_1$, respectively, and the points A and B and the points C and D correspond to the same respective values $P_1$ and $P_0$ of intake negative pressure. While the engine is operated at an ignition timing point $K_1$ obtained by interpolation from the points A, B, C and D, if a minimum fuel consumption operation pursued indicates that it is preferable to operate the engine at the ignition timing point $K_2$ (the value of the ignition timing point $K_2$ differs from that of the point $K_1$, although the engine speed N and the intake negative pressure $P_i$ take the same values $N_K$ and $P_K$, respectively), the value of the ignition timing point $K_2$ is substituted for that of the ignition timing at any one of the points A, B, C and D (the point A in the case of FIG. 5) which is closest to the point $K_1$ in respect of the values of the coordinates of the engine speed and intake negative pressure. In this way, each time a fuel consumption minimization operation provides a new and improved result, the mapped ignition timing is renewed.

Referring to FIG. 6, an apparatus for effecting the optimum control method according to the invention will now be described. In the Figure, numeral 1 designates a central processing unit (CPU), and 6 a data/address bus for connecting the CPU 1 to memories 2 and 3 and to input/output ports (I/O) 50, 51, 53 and 54. The memory 2 is a read-only memory (ROM) storing a program and fixed data. The memory 3 is a read/write memory (RAM). Numeral 4 designates a power source for the RAM 3. The map is stored in the RAM 3 and the contents of the RAM 3 are renewed upon attaining of each fuel consumption minimization operation. Numeral 7 designates a crank angle (engine rotation) sensor, 8 an electromagnetic pickup, and 9 a waveform reshaping circuit for the crank angle signal from the crank angle sensor 7 and its output is transferred as an interrupt signal directly to the CPU 1. Numeral 10 designates a speed counting circuit comprising a counter and a gate for measuring the engine speed from the output value of the waveform reshaping circuit 9. Numeral 13 designates an intake gas temperature sensor (thermistor), 14 a cooling water temperature sensor (thermistor), 15 a battery, 16 a throttle position sensor, 17 an intake manifold vacuum sensor, 11 a multiplexer for selecting one of the signals from the sensors 13 to 17, and 12 an A-D converter for subjecting the selected signal to A-D conversion. Numeral 18 designates a starter, and 19 a waveform reshaping circuit for the signal from the starter 18. The input/output ports 50 and 51 couple externally applied signals to the data/address bus 6. Numeral 20 designates a circuit for determining the pulse width of a drive pulse for an electromagnetic valve drive coil 205 for effecting fuel supply control, that is, the pulse width value computed by the CPU 1 is applied as an initial value to a down-counter 201 which counts down from the initial value in response to applied clock pulses having a predetermined frequency thereby determining the pulse width. Numeral 202 designates a gate, 203 a flip-flop, and 204 a transistor provided to energize the electromagnetic valve drive coil 205. Numeral 21 designates a D-A converter for performing D-A conversion, 22 an EGR control circuit, 221 a comparator for comparing an EGR valve (EGRV) position signal computed by the CPU 1 with a position signal from a position sensor 224 attached to an EGR valve, and 222 a transistor for energizing a drive coil of a vacuum control valve (VCV) 223 for controlling the position of the EGR valve. Numeral 23 designates a circuit for determining the ignition timing and the dwell angle (the primary coil energization period). Numerals 232 and 235 designate down-counters which receive, as their initial value inputs, the values computed by the CPU 1, i.e., a time interval until the initiation of the primary coil energization and a time interval until the stoppage of the primary coil energization (or the ignition timing) and which count down in response to the applied clock pulses of the predetermined frequency thereby to determine the desired coil energization period and ignition timing. Numerals 230, 239 and 236 designate flip-flops, and 237 a transistor for energizing an ignition coil 238. The I/O ports 52, 53 and 54 respectively connect the fuel supply control circuit 20, the EGR control circuit 22 and the ignition timing and dwell angle computing circuit 23 with the data bus 6. Numeral 30 designates a manual command switch for switching between the normal engine operation and the minimum fuel consumption operation.

Next, the methods of obtaining engine speed signals and detecting top dead center will be described. FIG. 7a shows the crank angle sensor 7, and FIG. 7b shows its signal waveform. These Figures show the case of a four-cylinder engine. As shown in FIG. 7a, the crank angle sensor 7 is constructed to generate a signal at 10 degree intervals except during 20 degrees following the top dead center (TDC). Since no signal is generated during 20 degrees following the TDC as shown in FIG. 7b, a period $T_1$ is about two times a period $T_0$. Thus, the measurement of this period is made use of to detect the TDC. More precisely, as would be obvious to those skilled in the art from the above description, the crank angle sensor 7 in FIG. 6 generates a signal at 10 degree intervals except during 20 degrees following the top dead center. (The 20 degree intervals appear at the crank angles of 0°–20° and 180°–200° as seen from FIGS. 7a and 7b.) Since there is a great difference (about two times) between the engine rotational time $T_1$ for the crank angle of 20° and the engine rotational time $T_0$ for the immediately preceding crank angle of 10°, it is easy to learn that the top dead center has just passed. Further, the time intervals $T_0$ and $T_1$ are measured in the speed counting circuit 10.

In the above-described embodiment, among the engine control variable which are arranged in a map only the value of the ignition timing is varied such that a new value thereof is substituted for the mapped value thereof, if the new value has reduced the fuel consumption rate. However, the same control method may be applied to the case where the air-fuel ratio, the EGR rate, or the like is varied.

Further, in the above-described embodiment, changes of the fuel consumption rate per unit distance are measured by monitoring changes in a related engine operating condition (speed) in response to a change in an engine control variable (timing) with the other operating conditions and control variables held constant. Obviously, if engine speed increases, with the throttle position, and thus the fuel consumption per unit time, remaining constant, the vehicle will travel further on the same amount of fuel. Thus, the rate of fuel consumption per unit distance decreases. However, the fuel consumption rate may be measured in terms of changes of the engine torque measured with a torque sensor or may be detected in terms of changes of the internal pressure of a cylinder.

Further, in the above-described embodiment, the manual command switch is used to effect the switching between the normal engine operation and the optimum fuel consumption operation. However, it is possible to automatically effect the switching at predetermined intervals (for example, every month) or at every predetermined travel distance (for example, at every travel distance of 1000 Km).

Further, the control method of this invention is applicable not only to engines employing fuel injection valves, but also to other engines provided with an electronically controlled carburetor (ECC), which controls the air bleed supply, or the like device.

It is apparent from the foregoing detailed descriptions that this invention provides an optimum control method for internal combustion engines wherein, during the normal operation of an engine, the engine is operated in accordance with one of the values of an engine control variable which are arranged in a map, and when the engine is switched to fuel consumption minimization operation, the mapped value of the engine control variable is changed by a predetermined amount and the engine is operated according to the changed value of the engine control variable, and, if the resultant change of the operating condition of the engine is in a direction to reduce the fuel consumption rate, the value of the engine control variable changed by the predetermined amount is substituted for the mapped engine control variable value. Thus, there is a great advantage such that it is possible to compensate for changes over time in the various parts of an engine due to wear and vibration or for the change in the characteristics of engines caused during the manufacture thereby to ensure minimum fuel consumption engine operation.

We claim:

1. An electronic control method for internal combustion engines comprising the steps of:

preliminarily storing in an electronic memory a plurality of values of an engine control variable which are arranged in a map with respect to a plurality of parameters indicative of operating conditions of an engine;

discriminating whether a normal operation or fuel consumption minimization operation of said engine is commanded;

discriminating whether said engine is in a steady operating condition;

operating said engine in accordance with one of said mapped engine control variable values corresponding to the values of said parameters indicative of a current operating condition of said engine when the result of said discriminating steps indicate that one of (1) a normal operation of said engine is commanded and (2) a minimization operation is commanded and said steady operating condition does not exist;

incrementally changing one of said mapped engine control variable values corresponding to the current operating condition of said engine and operating said engine in accordance with said changed engine control variable value when the result of said discriminating steps indicate that said fuel consumption minimization operation of said engine is commanded and said engine is operating in a steady condition;

detecting a change of one of said engine operating conditions caused by said change of said engine control variable value; and replacing said one of said mapped engine control variable values by said changed engine control variable value when said change of said engine operation condition is in a direction to decrease the rate of fuel consumption so that said engine is controlled by said changed engine control variable value when a normal operation is commanded next time.

2. An optimum control method according to claim 1, wherein said engine control variable is the ignition timing of said engine.

3. An optimum control method according to claim 1, wherein said engine control variable is the air-fuel ratio of a mixture gas supplied to said engine.

4. An optimum control method according to claim 1, wherein said engine control variable is the rate of exhaust gas recirculation.

5. An optimum control method according to claim 1, wherein said steady operating condition discriminating step includes the steps of:

discriminating whether a change in opening angles of a throttle valve of said engine is small or large; and discriminating whether a change in rotational speeds of said engine is small or large, wherein said changing step is effectuated only when the results of said change discriminating steps indicate that both of said changes in opening angles of said throttle valve and in rotational speeds of said engine are small, thereby indicating said engine is in a steady operating condition.

6. In a method for electronically controlling ignition timing in internal combustion engines, said method having a normal mode and a minimum fuel consumption mode of operation, said normal mode of operation comprising the steps of preliminarily storing in an electronic memory a plurality of values of an engine control variable which are arranged in a map with respect to a plurality of parameters indicative of operating conditions of an engine; discriminating whether a normal operation or a minimum fuel consumption operation of said engine is commanded; and operating said engine in accordance with one of said mapped engine control variable values corresponding to the values of said parameters indicative of a current operating condition of said engine when the result of said discriminating step indicates that a normal operation of said engine is commanded; a method of minimizing fuel consumption only when said engine is in a steady operating condition and minimum fuel consumption operation is commanded comprising the steps of:

incrementally changing ignition timing data corresponding to the current operating condition of said engine when the result of said discriminating step indicates that a minimum fuel consumption operation of said engine is commanded;

detecting a change of an rotational speed of said engine caused by said change of said ignition timing data; and updating stored ignition timing data to that which corresponds to an operating condition of said engine in the direction of increasing the rotational speed of said engine.

7. An optimum control method according to claim 6, wherein said discriminating step includes the steps of:

discriminating whether a change in opening angles of a throttle valve of said engine is small or large;

discriminating whether a change in rotational speeds of said engine is small or large; and effecting said ignition timing optimum control only when a manually operable switch has been operated by an operator of said engine;

wherein said changing step is effectuated only when the results of said change discriminating steps indicate that both of said changes in opening angles of said throttle valve and in rotational speeds of said engine are small.

* * * * *